United States Patent

McKay

[11] Patent Number: 5,359,820
[45] Date of Patent: Nov. 1, 1994

[54] SPACE SAVER WALL INSERT FOR APPLIANCES

[76] Inventor: Michael R. McKay, 7130 N. Foxmoore Ct., Jackson, Mich. 49201

[21] Appl. No.: 31,893

[22] Filed: Mar. 16, 1993

[51] Int. Cl.⁵ .......................... A47K 3/16; F16L 5/00
[52] U.S. Cl. .......................................... 52/34; 4/695; 4/696; 220/477
[58] Field of Search ................. 4/643, 647, 648, 649, 4/670, 695, 696, DIG. 7; 52/34; 174/48, 49; 220/476, 477; 248/57, 68.1

[56] References Cited

U.S. PATENT DOCUMENTS

| | | | |
|---|---|---|---|
| 264,172 | 9/1882 | Laskey | 220/477 X |
| 2,295,888 | 9/1942 | Bucknell et al. | 4/695 |
| 2,930,505 | 3/1960 | Meyer | 220/477 |
| 3,606,217 | 9/1971 | Leiferman | 4/695 |
| 4,654,900 | 4/1987 | McGhee | 4/670 |
| 4,717,101 | 1/1988 | Harrod | 248/57 X |
| 4,942,896 | 7/1990 | Slusser | 4/695 X |
| 5,261,444 | 11/1993 | Childers | 4/695 X |

Primary Examiner—Carl D. Friedman
Assistant Examiner—Kevin D. Wilkens
Attorney, Agent, or Firm—Beaman & Beaman

[57] ABSTRACT

A wall insert to be affixed within an opening in a vertical wall providing a finished recess for accommodating washer and dryer appliance fittings within the wall dimensions permitting the appliances to be mounted close to the wall. The insert is preferably of a molded synthetic plastic configuration, includes mounting flanges and lips, and an appliance fitting support.

8 Claims, 1 Drawing Sheet

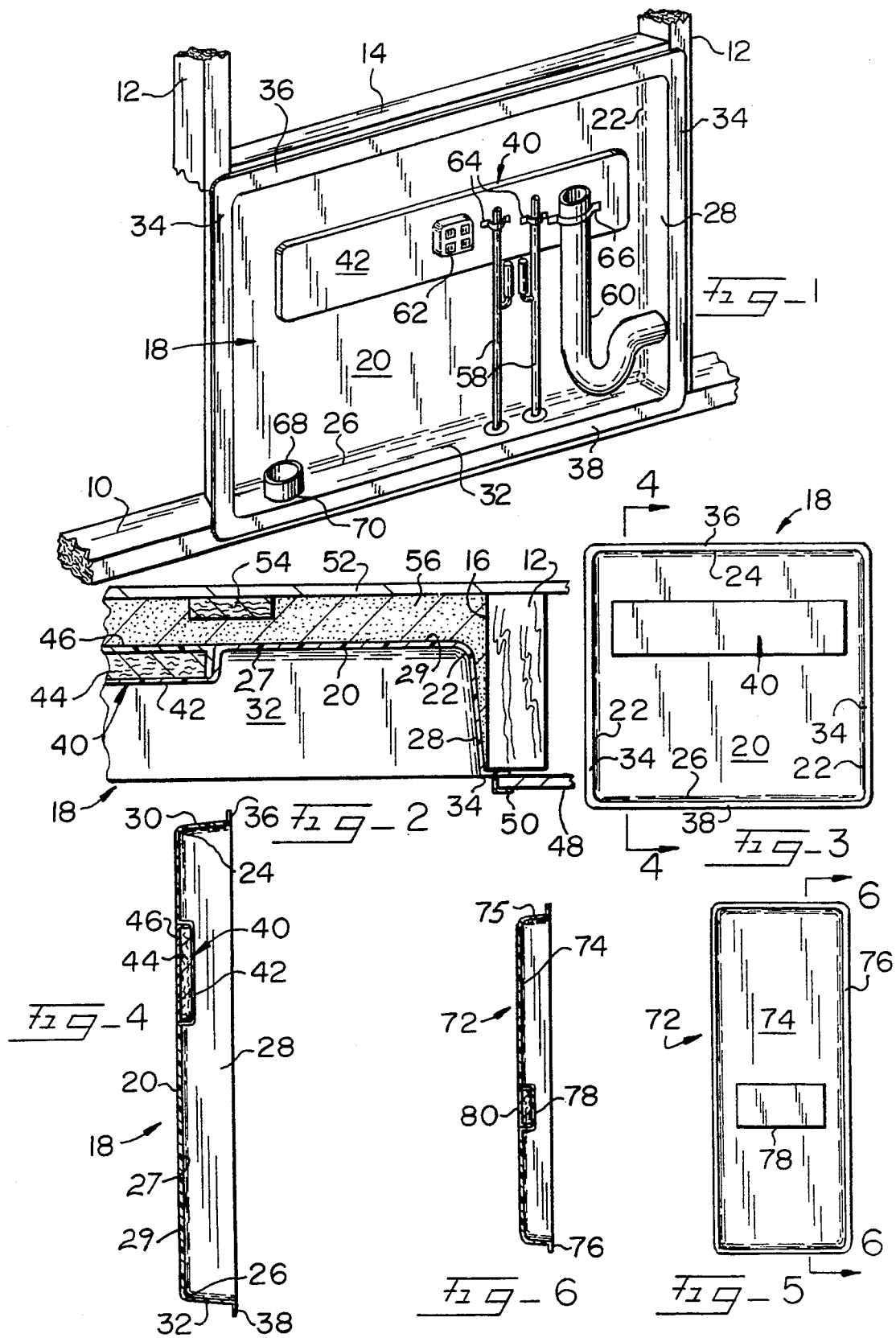

SPACE SAVER WALL INSERT FOR APPLIANCES

BACKGROUND OF THE INVENTION

1. Field of the Invention

The invention pertains to vertical wall inserts providing a finished recess in a wall for accommodating rear mounted washer and dryer appliance fittings within the wall dimensions.

2. Description of the Related Art

Appliances such as washers and dryers utilize back mounted fittings for connecting the appliances to the necessary plumbing, electrical outlets and vents. Automatic washers require hot and cold water supplies, a drain, and must be plugged into an electrical outlet. Dryers require gas or electrical connections, and also require a vent for exhausting the drying air externally of the dwelling.

The conventional practice is to attach the appliance's water, drain and electrical connections to a vertical wall and attach the appliance connections thereto by flexible hoses and electrical cords. The dryer vent conduit may be mounted in the wall, or in the floor adjacent the wall, and is usually attached to the dryer by a duct elbow, or the like. The necessity to accommodate the appliance hoses, vents, ducts and electrical cords behind the appliance requires that the appliance be located outwardly away from the adjacent wall approximately four inches or so. The necessity to locate the appliances away from the wall detracts from the usable floor space, and as many laundry areas have limited floor space, the necessity to locate the appliances away from the adjacent wall often results in cramped and inconvenience quarters, and may locate the appliances within the traffic pattern. Until the instant invention, a suitable solution to this problem has not been readily available.

OBJECTS OF THE INVENTION

It is an object of the invention to provide a space saving wall insert for vertical walls permitting a finished recess to be defined in a wall for accommodating appliance fittings, such as those used by washers and dryers, wherein the insert permits the appliance to be located directly adjacent a wall.

Yet another object of the invention is to provide a space saver wall insert for vertical walls wherein a recess within the wall is defined for accommodating appliance fittings, and wherein the recess is of a finished and attractive form and configuration.

Another object of the invention is to provide a space saving wall insert for providing a recess within vertical walls for accommodating appliance fittings wherein the insert includes a reinforced support for attachment of the appliance fittings thereto.

SUMMARY OF THE INVENTION

A space saving wall insert in accord with the invention comprises a panel which is preferably formed of a molded synthetic plastic material. The insert is of a generally rectangular configuration having a planar base portion having edges, and a flange extends from each edge perpendicular to the base and extending in a common direction from the base portion. A planar lip is located at the end of each flange whereby the lips will extend under adjacent wallboard structure such that the insert may be attractively finished adjacent the supporting wall structure.

The insert is of a dished configuration of approximately four inches, and includes a pocket on the unexposed side of the base portion having a board-like member mounted therein whereby appliance fittings may be mounted on the base portion exposed side and anchored into the board-like support. Preferably, a synthetic plastic cover is used to enclose the pocket.

The configuration of the insert is determined by the type of appliance installation with which it is used. When the washer and dryer are mounted in a side-by-side relationship, the insert configuration will be substantially square. However, when the washer and dryer are in a vertical stacked relationship, the vertical height of the insert will be substantially higher than its width.

BRIEF DESCRIPTION OF THE DRAWINGS

The aforementioned objects and advantages of the invention will be appreciated from the following description and accompanying drawings wherein:

FIG. 1 is a perspective view of a space saving wall insert for appliances in accord with the invention for accommodating side-by-side installed appliances, the water supply, drain, electrical outlet and vent fittings normally mounted within the insert being illustrated, FIG. 2 is an enlarged detail plan sectional view of an end region of the insert, as installed, FIG. 3 is a front elevational view of the insert, per se, FIG. 4 is an elevational sectional view as taken along Section 4—4 of FIG. 3, FIG. 5 is a front elevational view of a variation of a space saver wall insert in accord with the invention for accommodating vertically stacked appliances, and FIG. 6 is an elevational sectional view of the embodiment of FIG. 5 as taken along Section 6—6.

DESCRIPTION OF THE PREFERRED EMBODIMENTS

The floor saver insert of the invention is mounted within a conventional vertical wall of a dwelling or other building. Such a wall typically includes a floor plate 10, FIG. 1, and studs or uprights 12. Of course, in order to accommodate the insert of the invention the studs 12 will be spaced apart the desired distance. A cross beam 14 is horizontally interposed between the studs 12. Together, the plate 10, studs 12 and cross beam 14 define a rectangular opening 16, FIG. 2, in the vertical wall to which wall boards, drywall, paneling or the like will be attached in the normal manner.

Preferably, the insert of the invention is used with a six inch wall wherein the floor plate 10, studs 12 and beam 4 will be two by sixes. However, the insert can be employed wherein these elements are two by fours.

The space saving insert in accord with the invention is generally identified by the numeral 18, and is preferably molded of a synthetic plastic material, or otherwise formed. The insert 18 can be foraged of resin impregnated glass fiber, PVC, or other commonly employed building materials which are, preferably, non-corrosive and of an attractive appearance. The insert may be painted, but is preferably formed of a white or neutral colored material attractive to the eye.

The insert 18 includes a planar base portion 20 of a generally rectangular configuration having lateral side edges 22, a top edge 24 and a bottom edge 26. The base portion also includes an exposed side 27 and an unexposed side 29, such designations applying to the sides of the base portion 20 visible when the insert 18 is installed in a vertical wall.

Each of the base portion edges intersects a planar flange, the side edges 22 having the side flanges 28 extending therefrom, the top edge 24 being associated with the top flange 30, and the bottom edge 26 intersecting the bottom flange 32. The outer free ends of the flanges each include a terminating lip, i.e. the side flanges 28 having lips 34, the top flange having a lip 36, and the bottom flange 32 having a lip 38. Each of the lips are planar in configuration, and lie in the same plane which is parallel to the plane of the base portion 20.

A pocket 40 is defined in the unexposed side 29 of the base portion 20, and as will be appreciated from the drawings, the pocket 40 is of an elongated rectangular configuration extending between the side flanges 28. The pocket 40 forms an exposed planar surface 42 to which the appliance fittings are attached, as will be later described.

A rectangular board-like member 44 is located within the pocket 40 and is preferably bonded within the pocket by a construction type adhesive. The board 44 may be wood, composition wood, or other material which is nailable, drillable, and may serve as an anchor for the appliance fittings.

The pocket 40 is preferably closed by a synthetic plastic cover 46 having flanges closely received within the pocket, and the cover may be bonded or otherwise affixed in place to enclose the pocket 40 and the board member 44.

Installation of the insert 18 into the associated vertical wall is readily accomplished as the insert 18 is placed within the wall opening 16 in the manner appreciated from FIGS. 1 and 2. The opening 16 is of such dimension that the side lips 34 will overlie the studs 12, the upper lip 36 will overlie the cross beam 14, and the bottom lip 38 will overlie the floor plate 10. Nails or staples are then inserted through the lips to affix the insert 18 within the wall opening 16.

Wall panel, such as drywall 48, or the like, may then be attached to the floor plate 10, studs 12, cross beam 14 and other structure of the vertical wall in the normal manner. An angle edging 50, FIG. 2, is preferably located at the edge of the drywall where it overlaps the lips of the insert. In this manner, the insert will for an attractive finished recess within the associated vertical wall wherein only the base portion exposed side 27, and flanges will be visible, as well as the pocket surface 42.

On the opposite side of the vertical wall from the insert 18, conventional paneling or drywall 52 will be mounted upon the opposite side of the floor plate 10, studs 12 and cross beam 14, and to provide support for the panel 52 in direct opposed relationship to the insert 18 one by four columns 54 can be nailed in place for supporting the wall board 52. Insulation, such as glass fiber, or the like, may be located between the base portion 20 and the drywall 52 for noise dampening or thermal barrier purposes, if desired.

Once the insert 18 is located within the opening 16, as described above, the appliance fittings may be installed within the insert. Hot and cold water supply pipes 58 will extend upwardly through the bottom flange 32, the washer drain 60 may extend through the right side flange 28, and the electrical outlet 62 will be mounted upon the pocket surface 42 and attached to the appropriate power supply conductors, not shown. The water supply pipes 58 are anchored to the pocket surface 42 by clamps or anchors 64 which are screwed or nailed through the pocket surface 42 into the board member 44. Likewise, the drain fitting anchor clamp 66 is attached to the board 44 through the pocket surface 42. By anchoring the fittings to the board 44 a firm, high strength support of these fittings is assured.

The dryer vent duct 68 will extend upwardly through the bottom flange 32 through the circular opening 70 formed in the flange.

The washer and dryer appliances, not shown, may now be placed in a side-by-side relationship wherein the backs of the appliances will be facing the insert 18. The hoses, cords and vent fittings of the appliances, not shown, may now be connected to the supply pipes, drain, electrical outlet and vents located within the insert 18 in a normal manner, and the fact that these fittings and hoses are all located within the dimensions of the vertical wall formed by the plate 10, uprights 12 and cross beach 14, the appliance hoses and fittings will occupy no space within the room in which the appliances are located. Accordingly, the washer and dryer appliances may be pushed against the vertical wall until the wall or floor plate 10 is engaged, and maximum floor space within the laundry room is achieved by the practice of the invention.

In addition to improving the floor space of the laundry area, the use of the insert 18 permits ready access to the appliance fittings therebehind located within the insert 18, and the use of the insert 18 simplifies initial installation, plumbing and electrical work, and provides a very professional, attractive and efficient laundry appliance installation center.

FIGS. 5 and 6 illustrate a modified configuration of an insert 72 for use with washer and dryer appliances stacked in a vertical relationship. In such an arrangement, the washer is located below the dryer, not shown, and the floor space occupied by the appliances is minimized. Usually, such vertically stacked appliances are of a smaller dimension and capacity than side-by-side appliances utilizing the insert 18.

The insert 72 includes a base portion 74 having flanges 75 terminating in lips 76, and a pocket 78 is formed in the base portion 74 receiving a board-like member, and the pocket is closed by the cover 80.

The insert 72 is installed and utilized in a manner identical to that described with respect to FIGS. 1–4, and the insert 72 defines a recess in the associated vertical wall providing access for the appliance fittings permitting the appliances to be located directly adjacent the wall.

It is appreciated that various modifications to the inventive concepts may be apparent to those skilled in the art without departing from the spirit and scope of the invention.

I claim:

1. A wall insert to accommodate appliance fittings within the dimensions of a vertical wall comprising, in combination, a recessed panel molded of synthetic plastic material having a base portion having an exposed side and an unexposed side and having upper, lower and lateral edges, flanges extending from said base portion exposed side from at least two of said edges defining nailing supports, a pocket defined in said base portion unexposed side intermediate said edges, and an appliance fitting support located within said pocket.

2. In a wall insert as in claim 1, flanges extending from each of said base portion edges, each of said flanges having a planar terminating lip, the lips of said flanges being coplanar and lying within a plane substantially parallel to said base portion.

3. In a wall insert as in claim 1, said appliance fitting support comprising a nailable board-like member fixed within said pocket.

4. In a wall insert as in claim 3, a cover within said pocket enclosing said pocket and board-like member.

5. A wall insert to accommodate appliance fittings within the dimensions of a vertical wall comprising, in combination, a molded dish shaped panel having a substantially planar base portion having an exposed side and an unexposed side and having edges, a flange extending from each edge of said base portion from said exposed side, said flanges including substantially parallel, spaced, opposed lateral side flanges, each flange having a terminal lip defined at its end, said lips being substantially planar and lying in a common plane substantially parallel to the plane of said base portion, and an appliance fitting support substantially extending between said lateral side flanges comprising an elongated board-like member mounted on said base portion unexposed side intermediate said edges and flanges.

6. In a wall insert as in claim 5, a pocket defined in said base portion unexposed side, said board-like member being affixed to said base portion unexposed side within said pocket.

7. In a wall insert as in claim 6, a cover attached to said base portion enclosing said pocket.

8. In a wall insert as in claim 6, said panel being molded of a synthetic plastic material.

* * * * *